(12) United States Patent
Chelnik

(10) Patent No.: US 6,832,206 B1
(45) Date of Patent: Dec. 14, 2004

(54) AUTOMOBILE PARKING VERIFICATION SYSTEM (APVS)

(76) Inventor: Marc Chelnik, 255 10th St. #4RS, New York, NY (US) 10014

( * ) Notice: Subject to any disclaimer, the term of this patent is extended or adjusted under 35 U.S.C. 154(b) by 0 days.

(21) Appl. No.: 09/496,131

(22) Filed: Feb. 1, 2000

(51) Int. Cl.$^7$ .............................................. G06F 17/60
(52) U.S. Cl. ....................... 705/13; 705/28; 340/932.2; 235/384; 235/385; 235/31 R; 235/31 T
(58) Field of Search ..................... 705/13, 28; 235/384, 235/385, 31 R, 31 T; 340/932.2

(56) References Cited

U.S. PATENT DOCUMENTS

| | | | |
|---|---|---|---|
| 3,918,028 A | | 11/1975 | Humphrey ................ 340/146.3 |
| 4,282,425 A | | 8/1981 | Chadima, Jr. et al. ....... 235/462 |
| 4,501,958 A | | 2/1985 | Glize et al. .................. 235/382 |
| 4,621,189 A | | 11/1986 | Kumar et al. ................ 235/472 |
| 4,947,353 A | | 8/1990 | Quinlan, Jr. ................. 364/562 |
| 4,982,070 A | * | 1/1991 | Bezin et al. ................. 235/378 |
| 4,990,757 A | | 2/1991 | Edwards et al. ............. 235/384 |
| 5,091,727 A | | 2/1992 | Mahmood ................. 340/932.2 |
| 5,142,131 A | | 8/1992 | Collins, Jr. et al. .......... 235/472 |
| 5,278,395 A | | 1/1994 | Benezet ....................... 235/384 |
| 5,339,000 A | * | 8/1994 | Bashan et al. ............ 340/932.2 |
| 5,396,233 A | | 3/1995 | Hofmann ..................... 340/933 |
| 5,484,991 A | | 1/1996 | Sherman et al. ............. 235/472 |
| 5,541,398 A | * | 7/1996 | Hanson ....................... 235/472 |
| 5,751,973 A | * | 5/1998 | Hassett ......................... 705/13 |
| 5,839,085 A | | 11/1998 | Yoshikawa et al. .......... 701/117 |
| 5,905,247 A | | 5/1999 | Ilen ............................. 235/384 |
| 5,940,481 A | * | 8/1999 | Zeitman ........................ 705/13 |
| 5,963,129 A | * | 10/1999 | Warner ........................ 340/468 |
| RE37,822 E | * | 8/2002 | Anthonyson ................... 701/1 |

FOREIGN PATENT DOCUMENTS

WO      WO 9320539 A1 * 10/1993 ............ G07C/1/30

* cited by examiner

Primary Examiner—Tariq R. Hafiz
Assistant Examiner—J R Stimpak
(74) Attorney, Agent, or Firm—Stephen E. Feldman, PC

(57) ABSTRACT

The present invention is directed toward a method and apparatus for efficiently and accurately checking a parking facility to verify that the vehicles parked therein are legitimately parked. The present invention utilizes computer technology, various software applications, such as database applications, and various data transfer technologies that enable a parking facility to maintain accurate and updated records for the vehicles parked in their facility. The present invention eliminates the occurrence of fraud or improper usage of the parking facility and facilitates the regulation of overdue customer accounts. Furthermore, the present invention dramatically reduces the time previously required to check a parking facility by providing both on-site and remote access to pertinent information relating to automobiles parked therein.

21 Claims, 16 Drawing Sheets

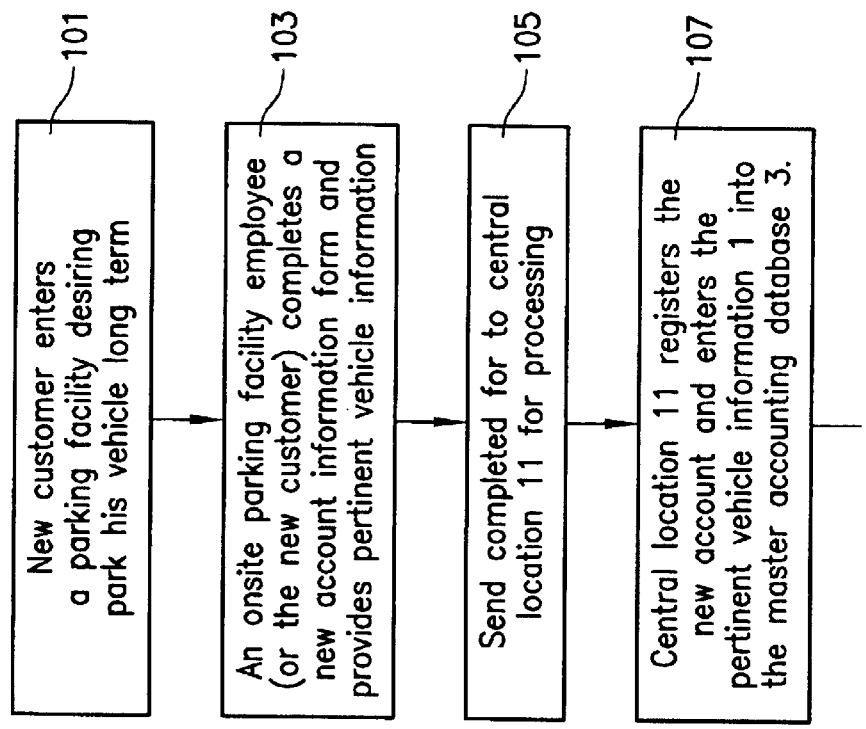
Fig. 4.1

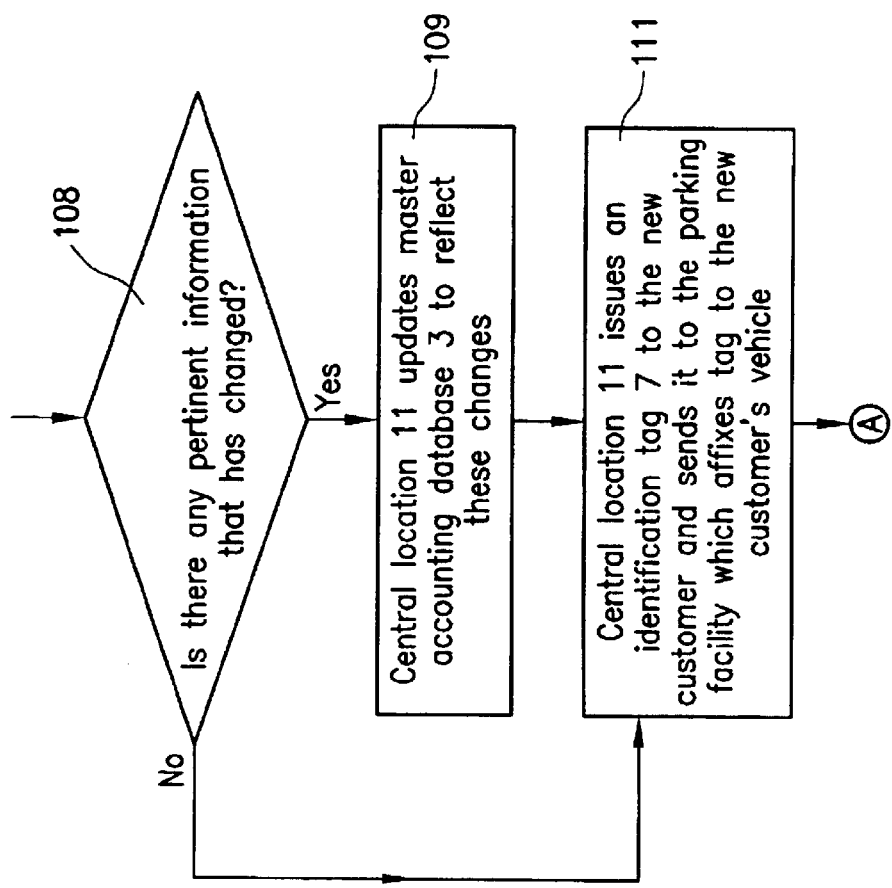
Fig. 4.2

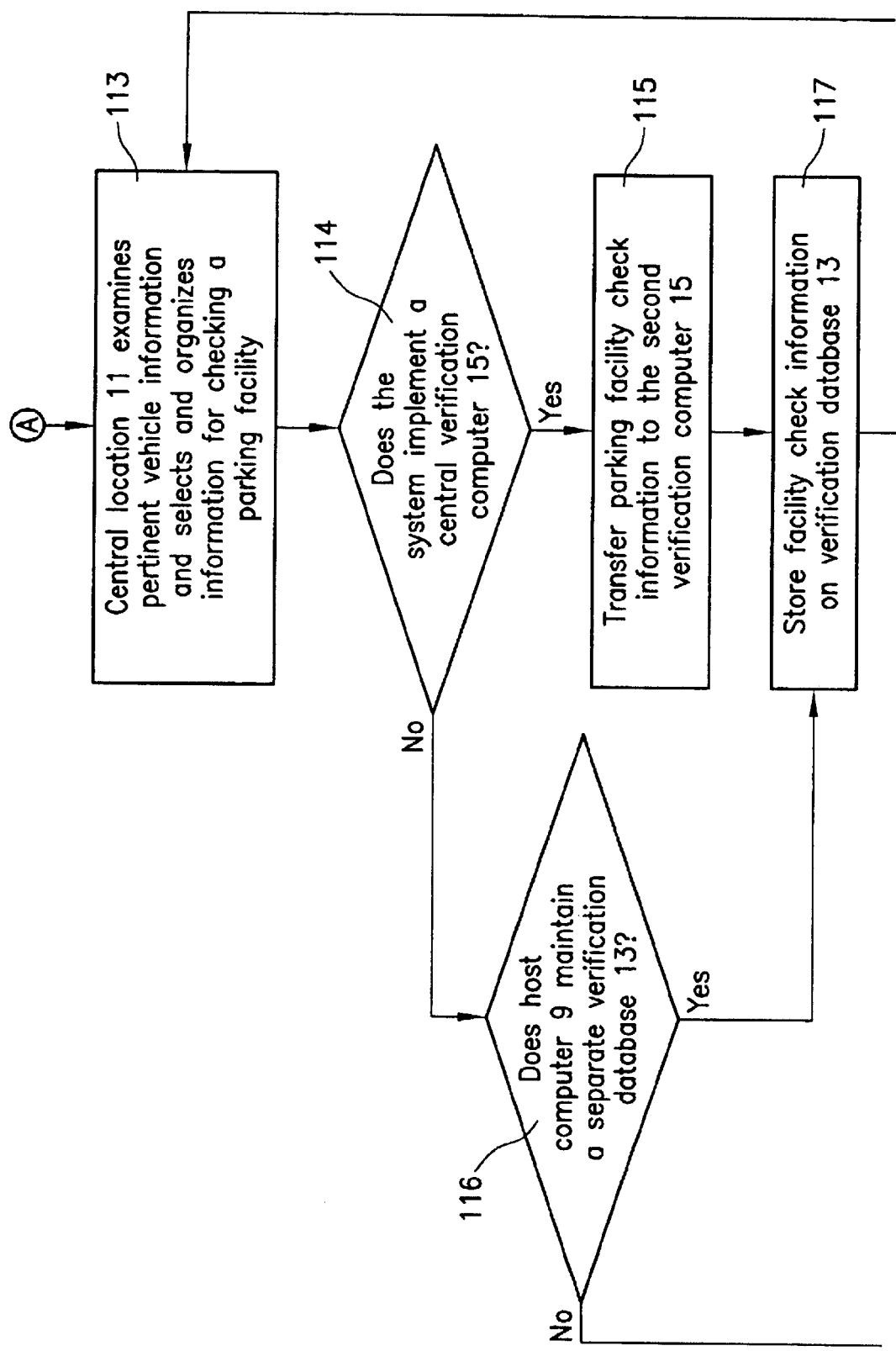
Fig. 4a.1

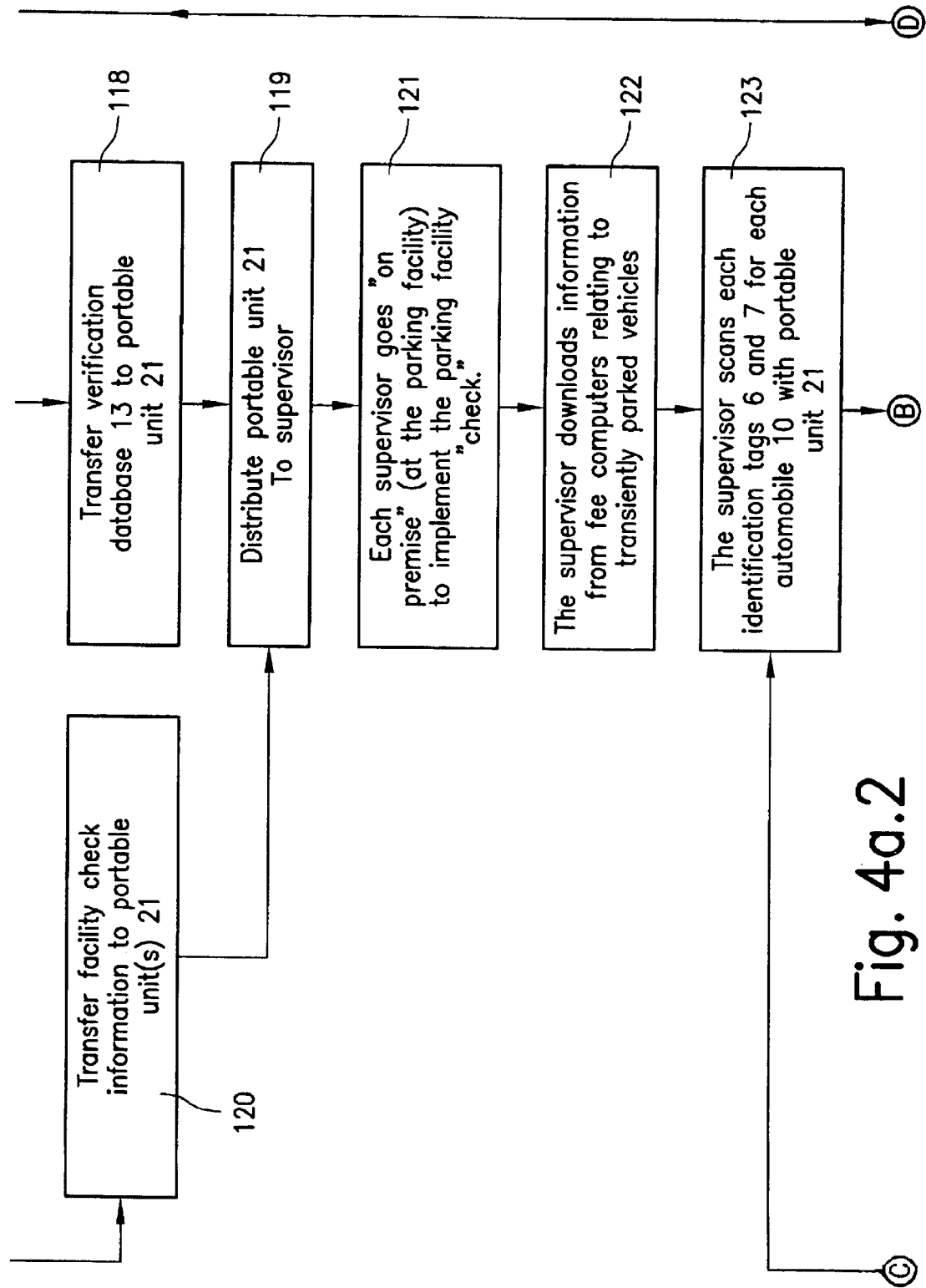
Fig. 4a.2

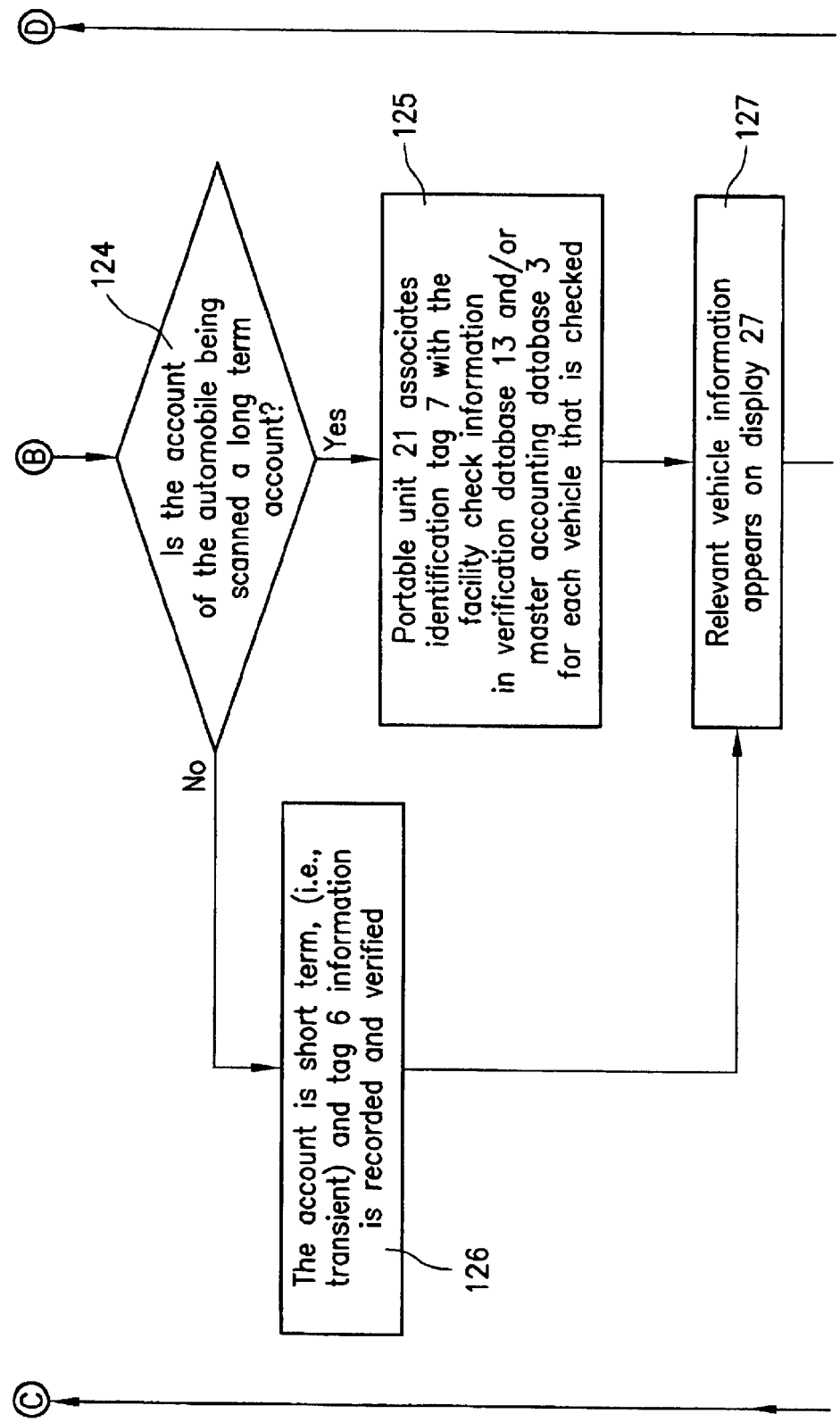
Fig. 4b.1

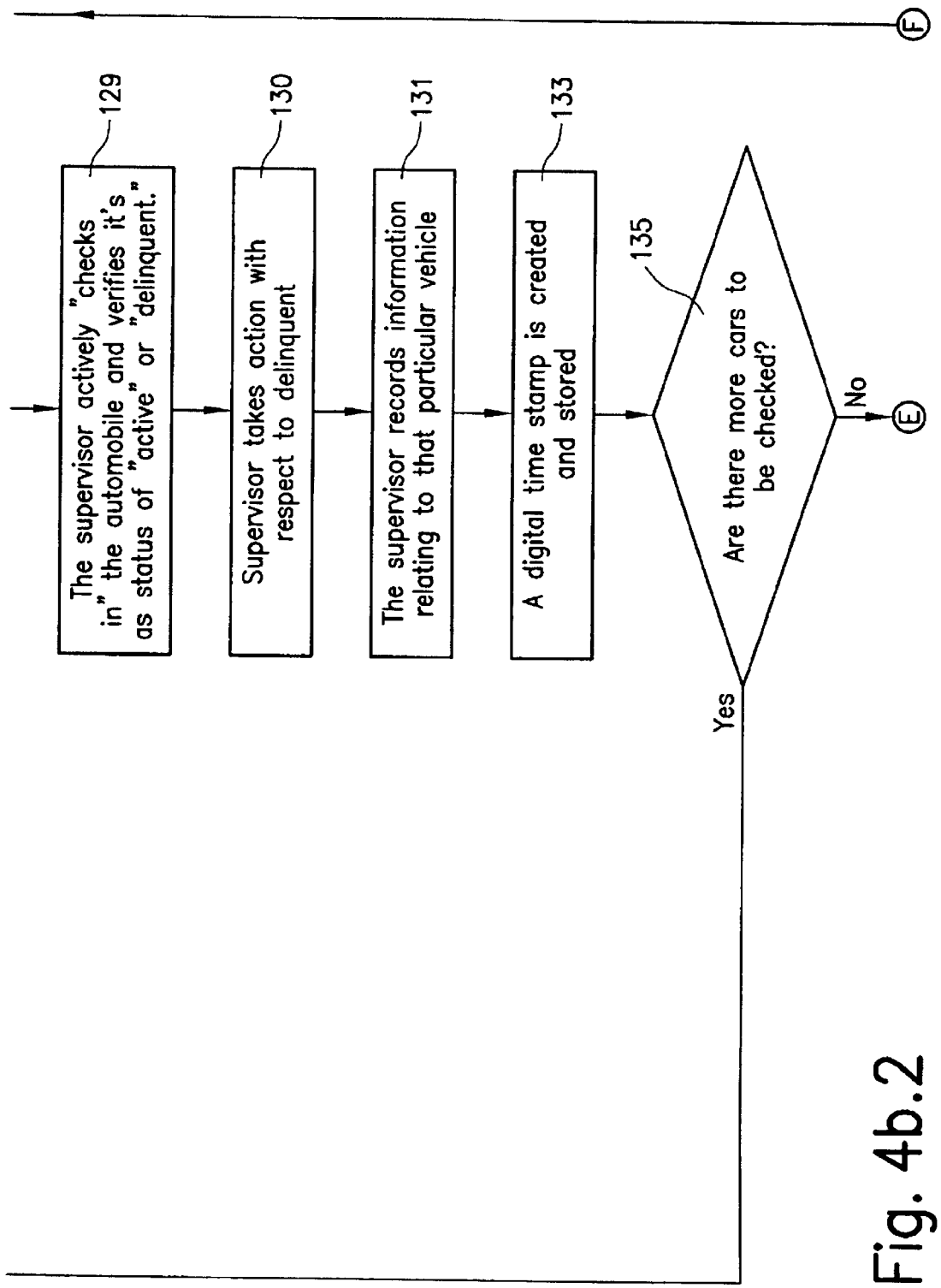
Fig. 4b.2

AUTOMOBILE PARKING VERIFICATION SYSTEM (APVS)

FIELD OF THE INVENTION

The present invention is directed toward a method and apparatus for improving the accuracy and time and to verify the status of automobiles parked in a commercial or controlled parking facility. The present invention implements a system that provides both on site and remote access to pertinent and current information relating to automobiles parked in the commercial or controlled parking facility.

BACKGROUND OF THE INVENTION

The present invention relates to a method and apparatus for verifying information relating to automobiles parked in a commercial or controlled parking facility. There are a variety of known methods and apparatus for checking information related to parked cars. However, these methods and apparatus present several problems that the present invention seeks to overcome.

Many cities and towns throughout the world are overpopulated and are very limited in space. Also, many parking areas are regulated to provide usage only for approved automobiles, such as employees or residents. For example, New York City is a small island yet it has over eight million residents and millions more visit the city each year. Due to the large population of these cities, there is a very limited number of public parking spaces. As a result, many people choose to park their vehicles in commercial parking facilities. Others park their vehicles in parking facilities because they are convenient and safe. Commercial parking facilities permit the public to park their vehicles in their space for a predetermined fee. Generally speaking, there are two types of customers who park their automobiles in commercial parking facilities. The first is "transient parkers" who pay by the hour to park their automobile. The second is regular customers who park for a longer term, and pay a fixed rate for every week, month or year. Thousands of regular customers park their automobiles in commercial facilities. Many people also park in non-commercial and/or regulated parking facilities. The cars in such facilities are often authorized to park in specific spaces and are allowed a specific number of spaces. Such authorization may be based on employment or residency that could periodically change. Accordingly, the facility must regulate these changes.

Most of the parking facilities maintain records for their accounts. It is imperative that the parking facility maintains information relating to each monthly account's automobile make, model, color, license plate number, owner, phone number, account balances and the space in which it is parked. Maintaining accurate records of this information can be a daunting task but is nonetheless necessary to ensure optimal efficiency and customer satisfaction.

Prior systems utilize sequential stickers and labels that are referenced to printed lists containing this information. Under these prior systems, a parking facility employee checks the parking facility each day to ensure that only the vehicles paying to park in the facility are actually parked there. Parking facility employee(s) check the facility by examining each car and the information on the list. An employee and/or supervisor periodically checks the facility to verify that each car parked in the facility corresponds to a printed monthly list. Similarly, checks of transiently parked vehicles are performed to verify that they have been issued tickets and determine the time the automobile entered the facility. This task is time consuming because the vehicle information must be read from a printed list and updates are recorded by hand. This is a daunting task to complete in large garages. However, the checking process is necessary to ensure that all automobiles present in a parking facility are accounted for and permitted to park there.

The prior systems are inefficient, time consuming and often result in inaccurate information due to human error. Furthermore, parking facility employees occasionally permit vehicles to improperly park in the facility (i.e., they do not charge a person to park his vehicle there). This situation results in the loss of revenue or improper usage of allotted spaces. Furthermore, issues of liability may arise. There is a long felt need for an efficient and accurate method and apparatus for checking a commercial or controlled parking facility. The present invention solves this long felt need.

There are other known methods and apparatus relating to maintaining and checking information relating to automobiles parked in a commercial facility.

U.S. Pat. No. 4,982,070 to Bezin et al. discloses a fee system for managing paid for vehicle parking by means of a magnetic card. The system comprises a parking terminal, a card reader, a portable terminal carried by a parking checker and a card and label to be attached to the windshield of a parked vehicle. In this system, the driver of the vehicle enters information into a parking terminal for purposes of payment. A checker examines the vehicle information to verify that the parked vehicle has paid to park in this space. This is problematic because the prior art does not contemplate managing vehicle information for automobile owners who pay a fixed rate to park regularly in the parking facility and/or integrates with various fee systems. Unlike the present invention, the driver of the vehicle or parking facility employee is required to enter information each time he parks his car in the facility. As a result, checking status information for regularly parked vehicles (or monthly accounts) utilizing this method would still be extremely time consuming and does not reflect updated account information. Furthermore, the prior does not interface with other fee systems to verify the automobile's status. As will be seen from the description herein, the present invention avoids the problems of Bezin.

U.S. Pat. No. 5,905,247 discloses a parking fee system, control device and identification means. This system is also problematic because it requires active participation by the driver of the vehicle and fails to manage account information efficiently. As a result, this system would be highly inefficient and time consuming for the purposes of checking information relating to regularly parked vehicles.

While the known methods and apparatus are of interest, they do not address the particular need to quickly and efficiently check information relating to automobiles regularly parked in a commercial or controlled parking facility, display current account receivables information (i.e., whether the automobile is past due 3 months), verify existing fee systems, and monitor the parkers possible discrepancies, including, change of car, substitute car, second car is present, and current approval status.

BRIEF SUMMARY OF THE INVENTION

The present invention is directed to an apparatus for checking and verifying the status of automobiles parked in a parking facility comprising: a host computer having a first database, said host having a first linking means for transferring and receiving information in said database; said first database comprising pertinent information relating to vehicles parked in the parking facility; identification means to be affixed to the automobiles parked in the parking facility; a least one portable unit for checking the parking facility; said portable means having a second linking means for transferring receiving information; and a sub-database, said sub-database comprising information relevant to checking the parking facility.

The present invention is also directed to method for checking and verifying the status of automobiles parked in a parking facility comprising the steps of: maintaining a first database on a host computer, said first database having pertinent information relating the automobiles parked in the parking facility; maintaining a second database on a verification computer, said second database comprising only information relevant to checking the parking facility; affixing an identification means to the automobiles parked in the parking facility; transferring said first database to said verification computer; selecting and organizing, from first database, information relevant to checking a parking facility; entering said relevant information into said second database; transferring said second database to a portable unit at the parking facility to be checked; checking said parking facility with said portable unit, wherein said portable unit relates said identification means with said pertinent information; verifying and storing on said portable unit the status of each automobile parked in the parking facility: updating and organizing results of said checking of the parking facility; sending said results of said check to said verification computer; entering said results of said check into said verification computer; and taking appropriate action with respect to delinquent cars.

It is an object of the present invention to provide a method and apparatus for efficient verification of information relating to automobiles parked in a commercial or controlled parking facility.

It is another object of the present invention to efficiently determine whether an automobile is legitimately parked in a parking facility.

It is another object of the present invention to efficiently determine whether the account for each parked automobile is past due and whether action should be taken.

It is another object of the present invention to provide a method and apparatus for interfacing vehicle information stored on a host computer database with on premise information that could be controlled remotely.

It is another object of the present invention to provide a method and apparatus for maximizing the management and organization of a commercial or controlled parking facility.

It is another object of the present invention to integrate parking system with the operation of a fee computer and thus provide a double check for the transient cars as well monthly accounts.

It is another object of the present invention to provide a method and apparatus that overcomes the problems of the prior art.

Other objects of the present invention will become apparent from the foregoing description.

BRIEF DESCRIPTION OF THE DRAWINGS

The drawings of the invention are by way of example, and the scope of the invention is not limited to the exact details shown, represented, or described.

FIG. 4 is a flow diagram illustrating the method applied to the system of the present invention.

FIG. 4a is a continuation of the flow diagram of FIG. 4.

FIG. 4b is a continuation of the flow diagram of FIGS. 4 and 4a.

DETAILED DESCRIPTION OF THE PRESENT INVENTION

Figure 1:
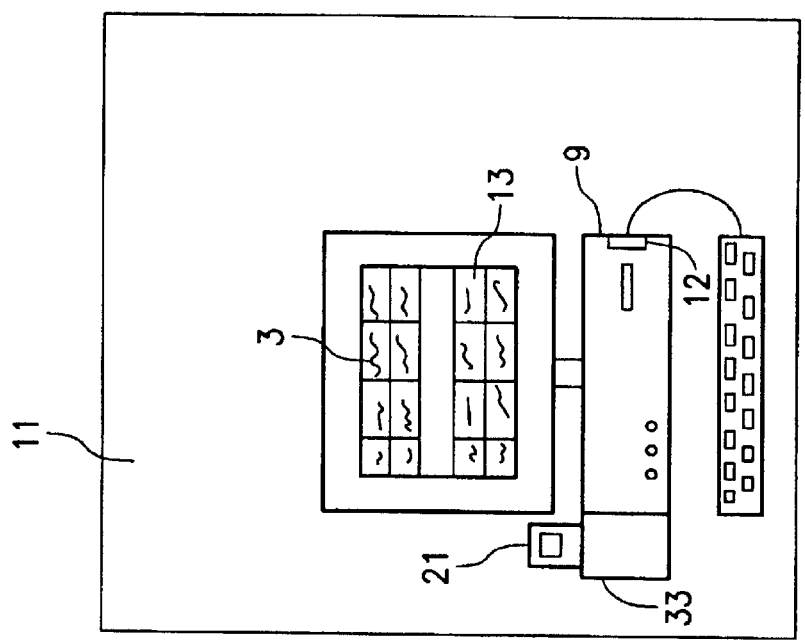
FIG. 1 illustrates one embodiment of the system of the present invention wherein a database and sub-database are maintained on a host computer with a portable unit, wherein the system may be maintained at a central location.

The method and apparatus of the present invention is of broad applicability for many technical fields. For illustrative purposes only, a preferred mode for carrying out the inventive method will be described hereinafter in conjunction with the apparatus of the present invention, namely, an Automobile Parking Verification System (hereinafter, "APVS").

The present invention is directed to a method and apparatus for providing a parking system that allows for both on site and/or remote access of pertinent information pertaining to vehicles parked long term and/or short term in a commercial or controlled parking facility (hereinafter, "parking facility"). Accordingly, the present invention may be implemented with respect to transiently parked vehicles in addition to long term parkers. In short, the present invention is implemented to efficiently and accurately "check" a parking facility. The term "check" may be understood to include, but is not limited to: the process of verifying information relating to automobiles parked (either long term or short term) in a parking facility; maintaining accurate and updated records; verifying that the vehicles parked in a parking facility are legitimately parked and account is current; and all other meanings that will be apparent from the detailed description herein. However, the term "check" should be construed in the broadest sense to include any variations of the method described herein.

The system of the present invention is discussed below. As will be seen herein, the system of the present invention is implemented to carry out the method of the present invention. As will be apparent from the foregoing discussion, a combination of computers, databases, linking means and other hardware is implemented with the system of the present invention.

A vehicle owner may desire to park his car in a parking facility on a long-term basis, such as on a monthly basis. Generally, a parking facility charges it customers with respect to time or alternatively, the parker may be authorized to park at the facility (i.e., a corporate or residential facility with assigned spaces). In the case of the commercial application, the parking facility may charge a vehicle owner a fixed price on a weekly, monthly or yearly basis. Initially, a vehicle owner agrees to pay a fixed price to the parking facility for parking his vehicle on a long-term basis. Hundreds of vehicles may be parked in a parking facility at any given time. In the case of non-commercial and/or regulated applications, the system verifies the cars permission to be parked in the location and space number. To operate efficiently, it is imperative that the parking facility maintain accurate and updated records of the vehicles parked therein. Therefore, most facilities maintain records relating to the vehicles parked long term.

The general process for maintaining such records is outlined as follows. A new automobile should be "registered" to the parking facility where his car will be parked. Accordingly, the automobile owner submits a completed form with pertinent vehicle information, such as billing information and a vehicle description. Pertinent vehicle information may include, but is not limited to, the vehicle owner's name, address, and phone number; number of cars permitted; vehicle make, model, color and license plate number; day or evening parker; bar coded number identification information (discussed herein) and parking space number; and billing information. Each automobile parked in the parking facility has vehicle information unique to that particular automobile. Once the form is completed, it is sent to a central location 11 to be processed on the automobile parking verification system of the present invention. As will be shown herein, the information is collected and disseminated via portable data units that are used to check the parking facility. These portable units are interfaced with the master accounting database and have the capacity to interface with an on site fee computers.

Host Computer and Master Accounting Database

The following material describes the computer hardware and main database used for storing and maintaining the pertinent vehicle information that is used to manage a parking facility.

Figure 11:
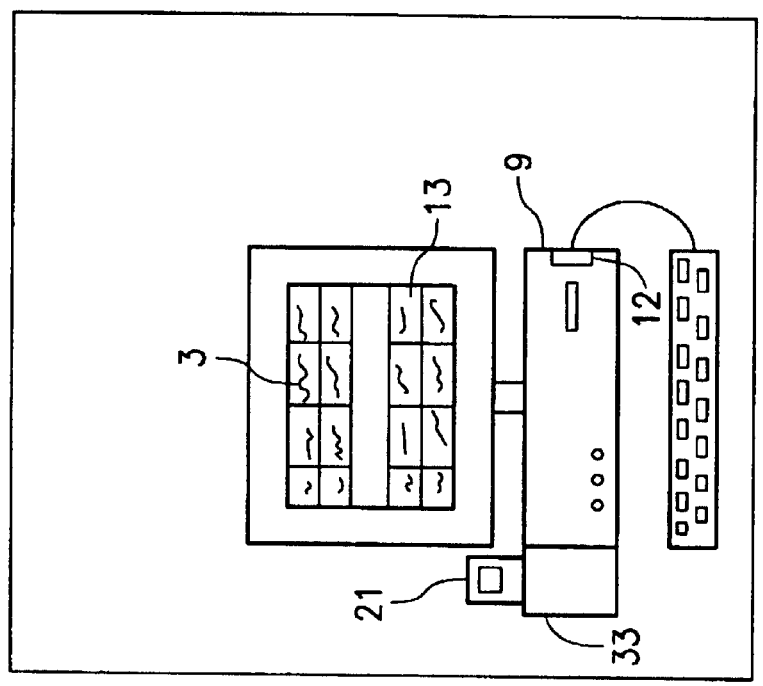
FIG. 11 illustrates an eighth embodiment of the system of the present invention wherein a database and sub-database are maintained on a host computer with a portable unit, wherein the system may be maintained at a parking facility.

Referring to FIGS. 1 and 11, a host computer 9 may be maintained at a central location 11 or at the parking facility. Preferably, central location 11 is a remote office separate from the parking facility to be checked. However, central location 11 may be at other places, such as a billing service provider's premises or at the parking facility. A master accounting database 3 is maintained on host computer 9. Conventional database software such as Microsoft Access, Lotus and Clairis may be implemented. Pertinent vehicle information may be entered and stored on master accounting database 3. Accordingly, accounting information and vehicle information may be maintained on host computer 9 and master accounting database 3 may be used to update and maintain monthly bills and reports.

Figure 3:
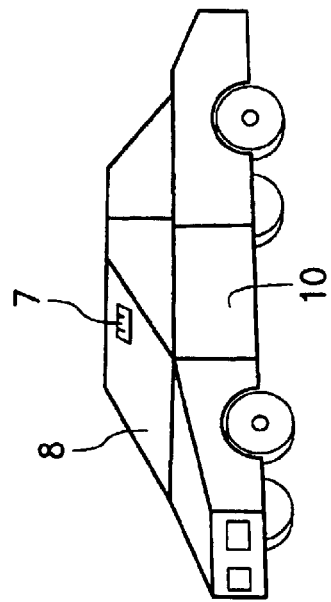
FIG. 3 of the present invention illustrates the implementation of an identification tag used for vehicles parked long term in a parking facility.
Figure 3A:
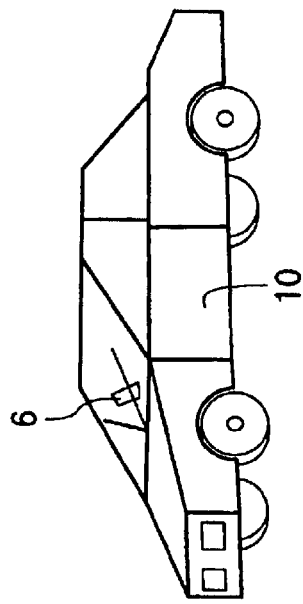
FIG. 3a of the present invention illustrates the implementation of an transient parking tag used for vehicles parked short term in a parking facility.
Figure 2:
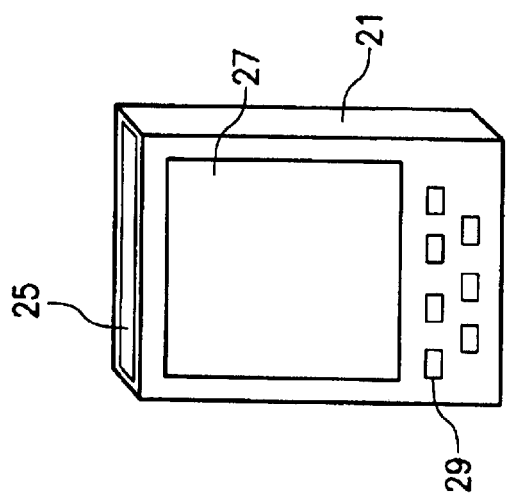
FIG. 2 of the present invention illustrates a portable unit that may be implemented in the present invention.

Once the pertinent vehicle information is entered into master accounting database 3, an identification tag 7 is assigned to each vehicle and affixed to an easily accessible surface 8 of the parked vehicle 10. Referring to FIG. 3, it is preferable that identification tag 7 is affixed to the windshield of the vehicle 10. However, identification tag 7 may be affixed to other surfaces 8, such as a rear window, side window, bumper and the like. Each identification tag 7 contains identification data that corresponds to the pertinent vehicle information maintained on master accounting database 3. Identification tag 7 may be a bar code, magnetic strip, or other identification means. Similarly, a transient parking tag 6 may be issued by a parking facility with respect to vehicles parked transiently. Referring to FIG. 3a, transient parking tag 6 may be temporarily affixed to the transiently parked vehicle 10. For example, transient parking tag 6 may be placed under a wind shield wiper or any other easily accessible part of the vehicle 10.

Central Verification Computer and Verification Database

The following material describes additional computer hardware and a sub-database used for storing and maintaining the information used for checking a parking facility.

Master accounting database 3 contains a great deal of information, some of which is not useful for the purpose of checking a parking facility. Preferably, a sub-database should be implemented for storing only the information needed for checking a parking facility. To create this database, central location 11 should first examine master accounting database 3 and gather and organize only information that is needed for checking a parking facility (hereinafter, "facility check information"). Facility check information includes, but is not limited to, identification tag number, location of vehicle, account number, balance, make of the car, color of the car, plate, a check function, number of cars, time-date stamp, comments and other function features. The check function may include information such as, "no entry, car is in, update information, problem, car is out, replacement car, etc." Once it is gathered and organized, facility check information is transferred to and entered into the sub-database, verification database 13. Verification database 13, a subset of the master accounting database 3, is a tracking database that organizes the facility check information that is ultimately sent to the parking facility to be checked. Standard database software such as Microsoft Access, Lotus and similar software may be implemented.

Figure 8:
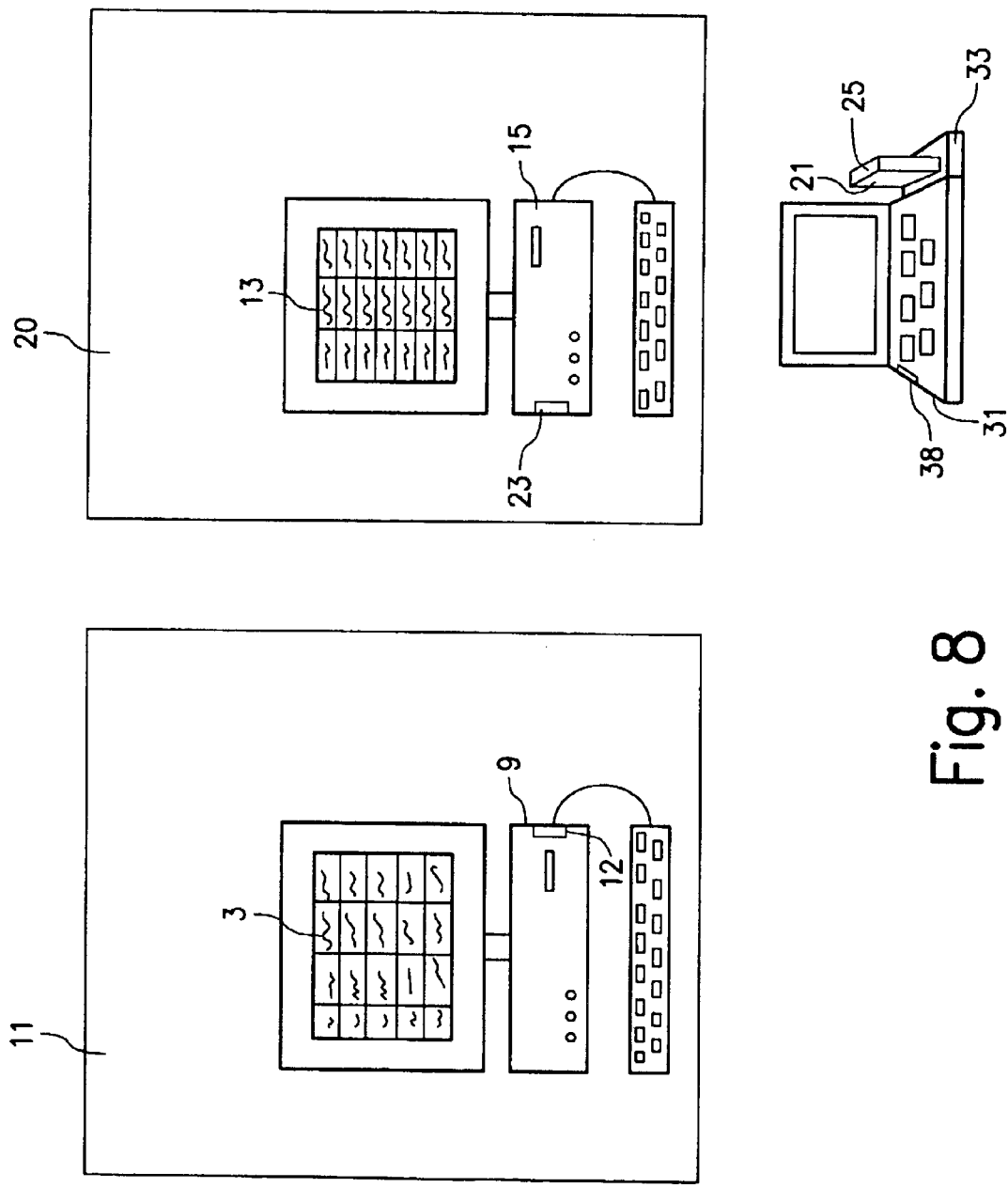
FIG. 8 illustrates a fifth embodiment of the system of the present invention wherein linkage of components is accomplished via remote linking.
Figure 9:
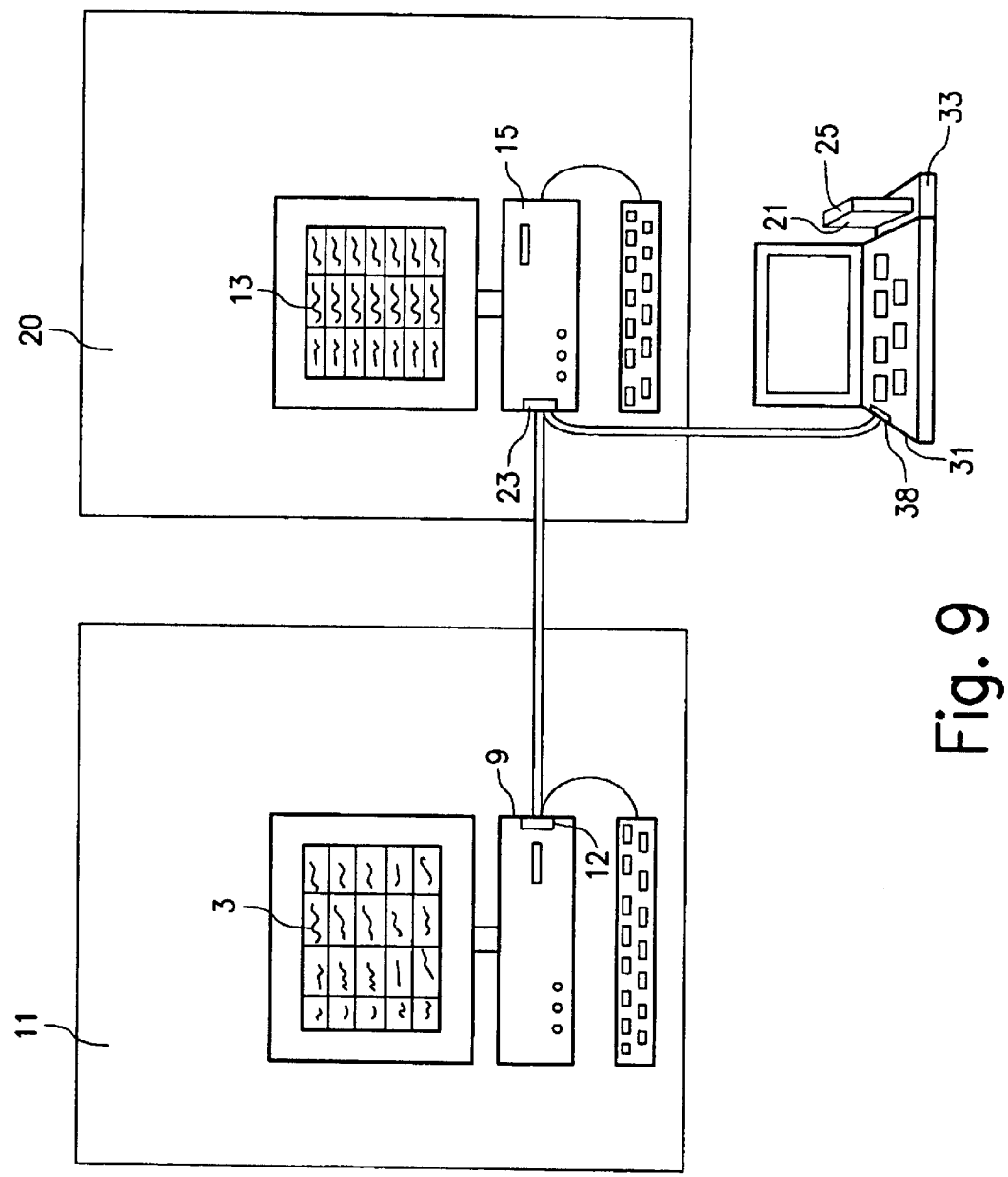
FIG. 9 illustrates a sixth embodiment of the system of the present invention wherein a host computer is maintained at a central location, verification computer is maintained at a second location, and sub-host computer or fee computer with a portable unit are maintained at a parking facility.
Figure 10:
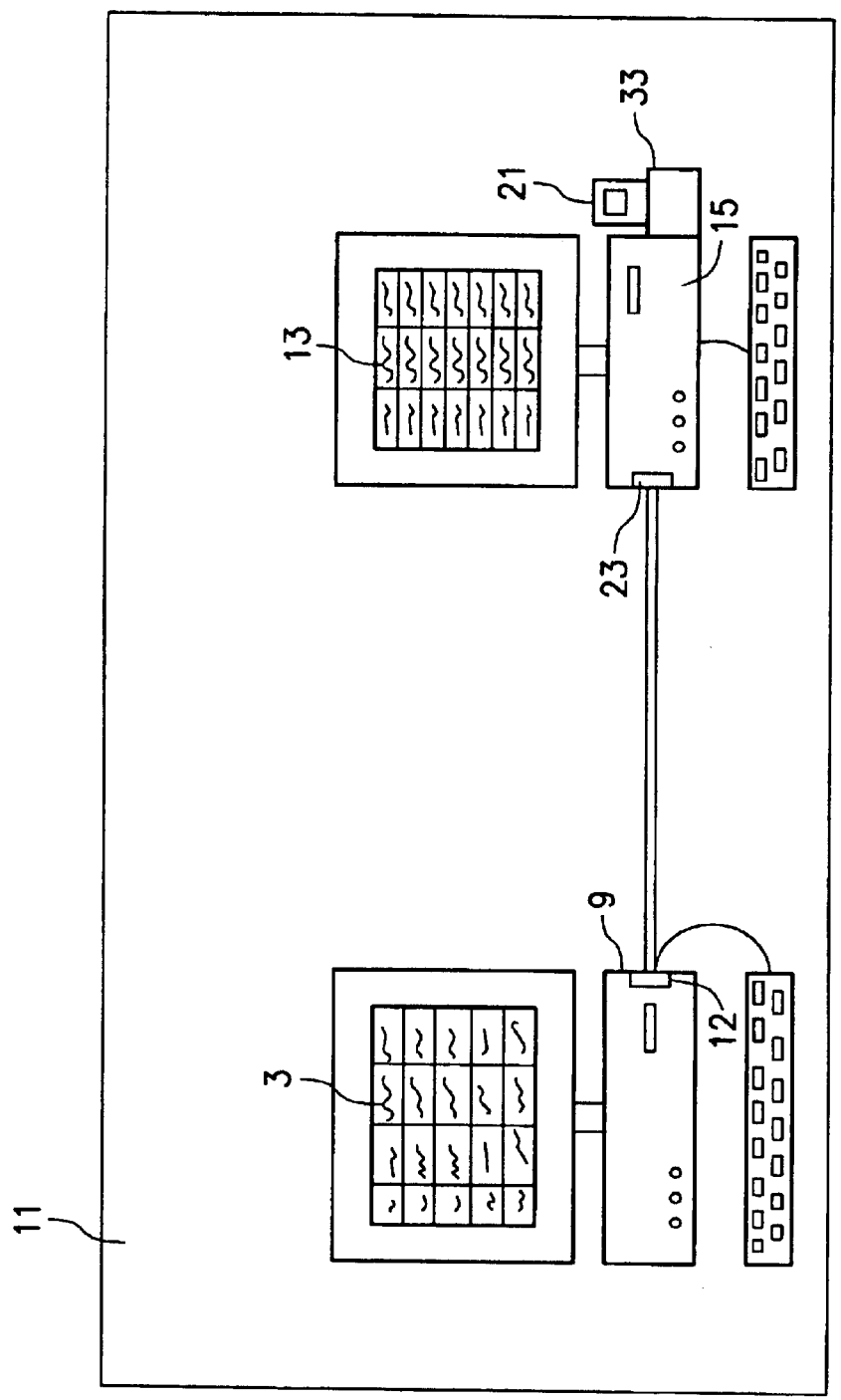
FIG. 10 illustrates a seventh embodiment of the system of the present invention wherein a host computer, verification computer and portable unit are maintained at a central location.

Preferably, verification database 13, a sub-database of master accounting database 3, is also maintained on host computer 9 as depicted in FIG. 1. However, verification database 13 may be maintained at other locations as well. For example, verification database 13 may be maintained on a second computer, central verification computer 15 as depicted in FIGS. 5, 6, 7, 8, 9 and 10. When implemented, central verification computer 15 should be maintained at central location 11 as depicted in FIG. 10. However, central verification computer 15 may be maintained at other locations. For example, central verification computer 15 may be maintained at a second central location 20 so that databases 3 and 13 are maintained separately. This configuration is designed to protect the security and integrity of the system. Referring to FIGS. 8 and 9, a sub-host computer 31 may be provided for downloading facility check information to portable device 21. In this embodiment, sub-host computer 31 should be maintained at the parking facility to be checked. Sub host computer 31 must be capable of receiving and storing relevant information from verification computer 15. Preferably, sub-host computer 31 is provided with a cradle 33 that enables it to "synchronize" portable device 21 with verification computer 20 so that facility check information may be downloaded.

The Portable Unit

The following material describes computer hardware and a sub-database used for the actual process of checking a parking facility.

A portable unit 21 is used to check parking facilities and may be maintained either centrally or remotely. Portable unit 21 may be any portable computing device. In one embodiment, portable unit 21 is a Symbolics Palm Piolt PT-1500 modified to include a bar code scanner capable of reading Identification tag 7 or tag 6. However, other portable units 21 may be implemented. For example, a laptop computer with an integrated bar code scanner, modern "CE" MS operating system handheld computers, and other means may be implemented. Portable unit 21 should also have sufficient memory and storage capable of storing a large database. Portable unit 21 should run software capable of manipulating and updating facility check information stored therein. Portable unit 21 should run APVS software programmed to relate the information on identification tag 7 and tag 6 to the facility check information contained in verification database 13 and/or information from a fee computer. Commercially available software such as Palm OS Pendragon Forms 3.0 may be adapted and formatted by APVS. In another embodiment, the present invention implements proprietary database software developed specifically for this parking system. The portable device could be maintained at the remote parking facility and receive and transmit information remotely using the linkage discussed herein. Once the facility check information is transferred, portable unit 21 may be utilized "in the field" at the various parking facility locations to be checked. Portable unit 21 contains a data reading device 25 for reading identification tag 7. Preferably, data reading device 25 is a bar code scanner. However, other data reading devices such as magnetic strip readers, proximity readers and other modern identification systems may be implemented as well. Portable unit 21 should be capable of displaying facility check information while checking the validity of the automobiles parked at the facility. Accordingly, portable unit 21 should be equipped with a display 27 and an input means 29. Input may be achieved in different ways. For example, input may be achieved automatically through the use of a data reading device 25, such as a bar code scanner, by scanning identification tag 7 and tag 6. Additionally, input may be achieved through the use of input means 29. Input means 29 may include a touch sensitive screen, keypad, voice recognition system and other means for inputting information.

Linking Means

The following materials discuss the hardware and software implemented for transferring both relevant vehicle information and facility check information between the apparatus discussed above.

It is important that information may be quickly and easily sent to the various locations discussed herein. Referring to FIGS. 1, 5, 6, 7, 8, 9 and 10 a variety of linking means may be used for transferring information over the system. Accordingly, host computer 9 has a linking means 12, central verification computer 15 has a second linking means 23, portable unit 21 has a third linking means 34 and sub-host 31 has a fourth linking means 38. Linking means 12, 23, 34 and 38 may be any variety of remote linkage or standard direct wire linkage. For example, a modem, hotwire, radio frequency, infrared signals and any other linkage device now known or hereinafter developed may be implemented. A Portable linkage unit, such as cradle 33, may be provided for transferring information from verification database 13 to portable unit 21. Networked environments, such as the Internet, office networks, extranet, etc., may be established at the remote location for transferring and receiving database information. Information could be sent over such networks via standard network protocol.

In one embodiment, a network is implemented to link the central verification computer 15 with remote systems at the various parking facilities as well as host computer 9. Linking means 12, 23, 34 and 38 may be lans, ethernets, modems,etc and information is transferred between locations via standard network protocol. In another embodiment, the network implemented is the Internet. In another embodiment, information may be stored on a floppy and delivered to each location where the information may be downloaded. In yet another embodiment, information is transferred via remote linkages, such as radio frequency, infrared signals and the like. As can be seen, linkage may be accomplished through a variety of now known or hereinafter developed methods and linking means.

Method of Invention

Having described the apparatus of the parking system, the method implemented with the apparatus is described with detail below.

Figure 4C:
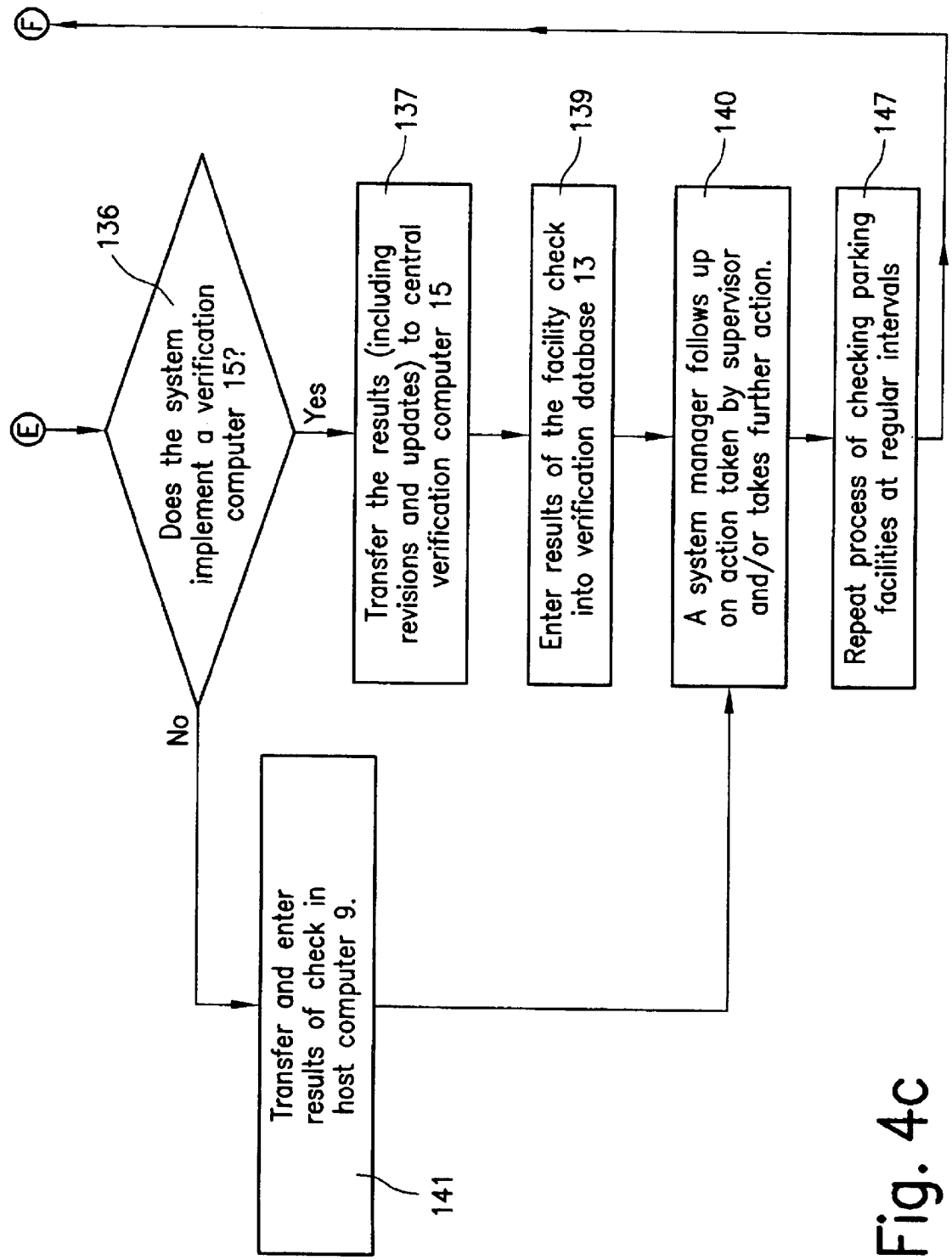
FIG. 4c is a continuation of the flow diagram of FIGS. 4, 4a and 4b.
Figure 5:
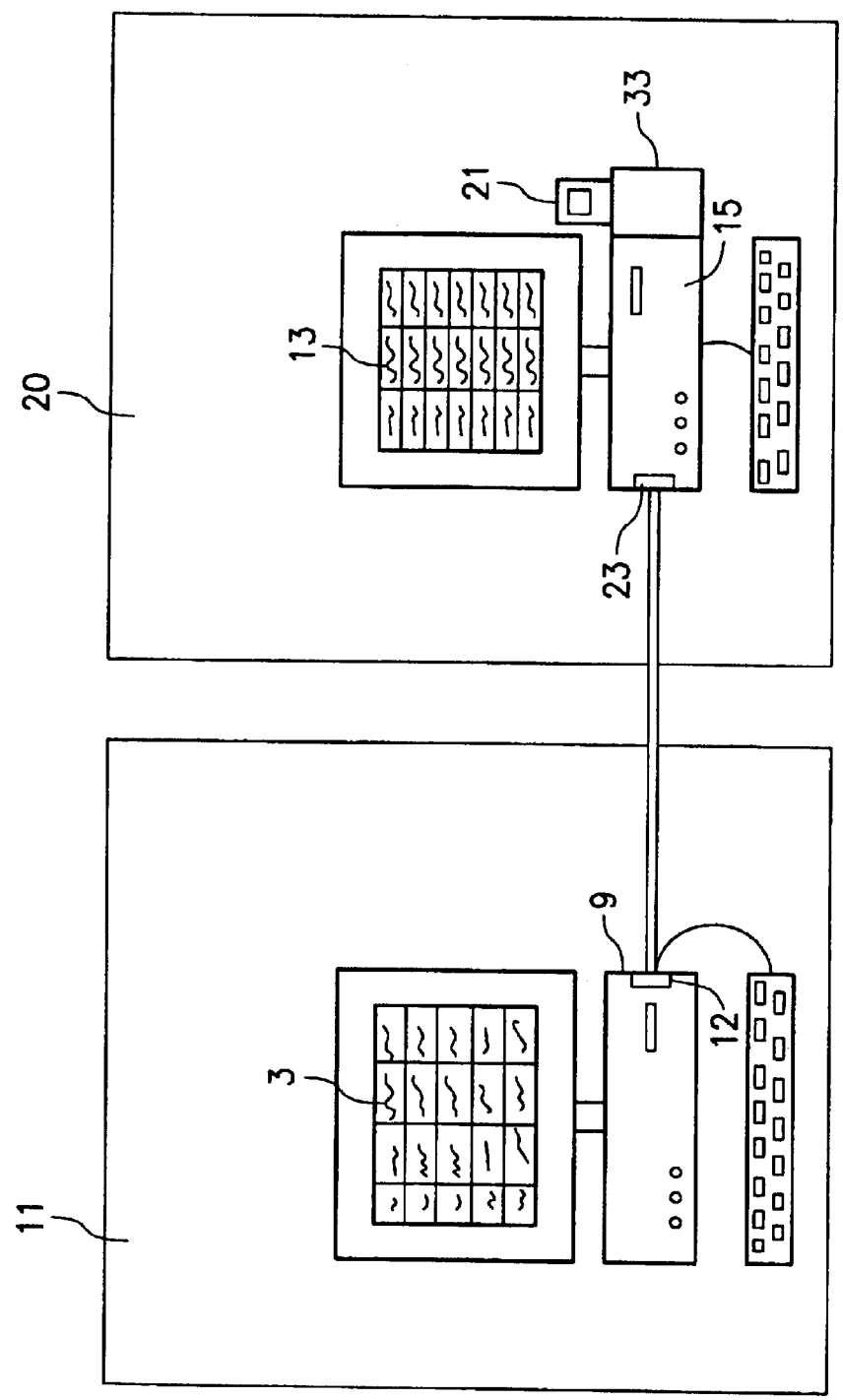
FIG. 5 illustrates a second embodiment of the system of the present invention wherein a host computer is maintained a central location and a verification computer and portable unit are maintained at second central location.
Figure 6:
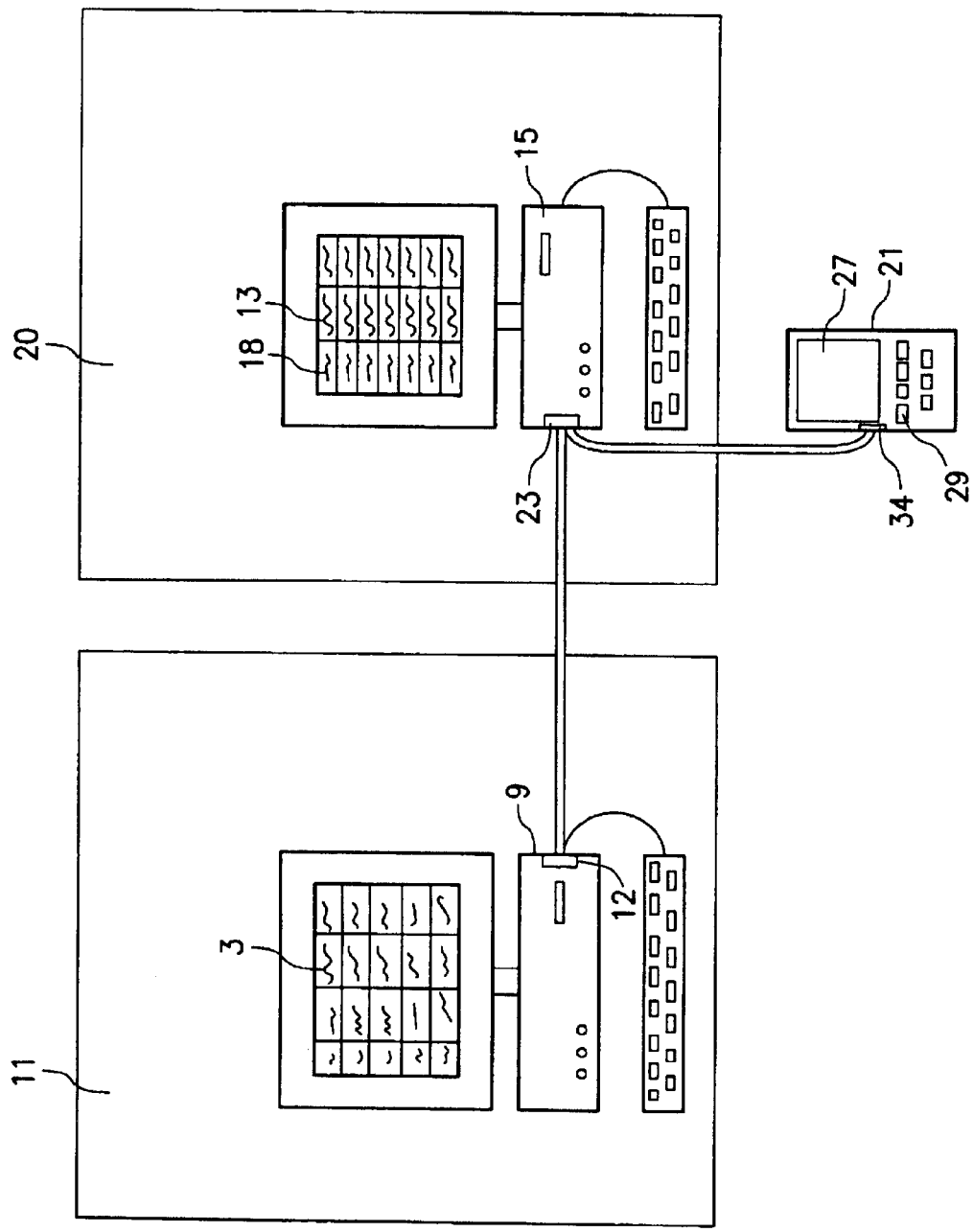
FIG. 6 illustrates a third embodiment of the system of the present invention wherein a host computer is maintained at a central location, verification computer is maintained at a second central location, and portable unit is maintained at a parking facility to be checked.
Figure 7:
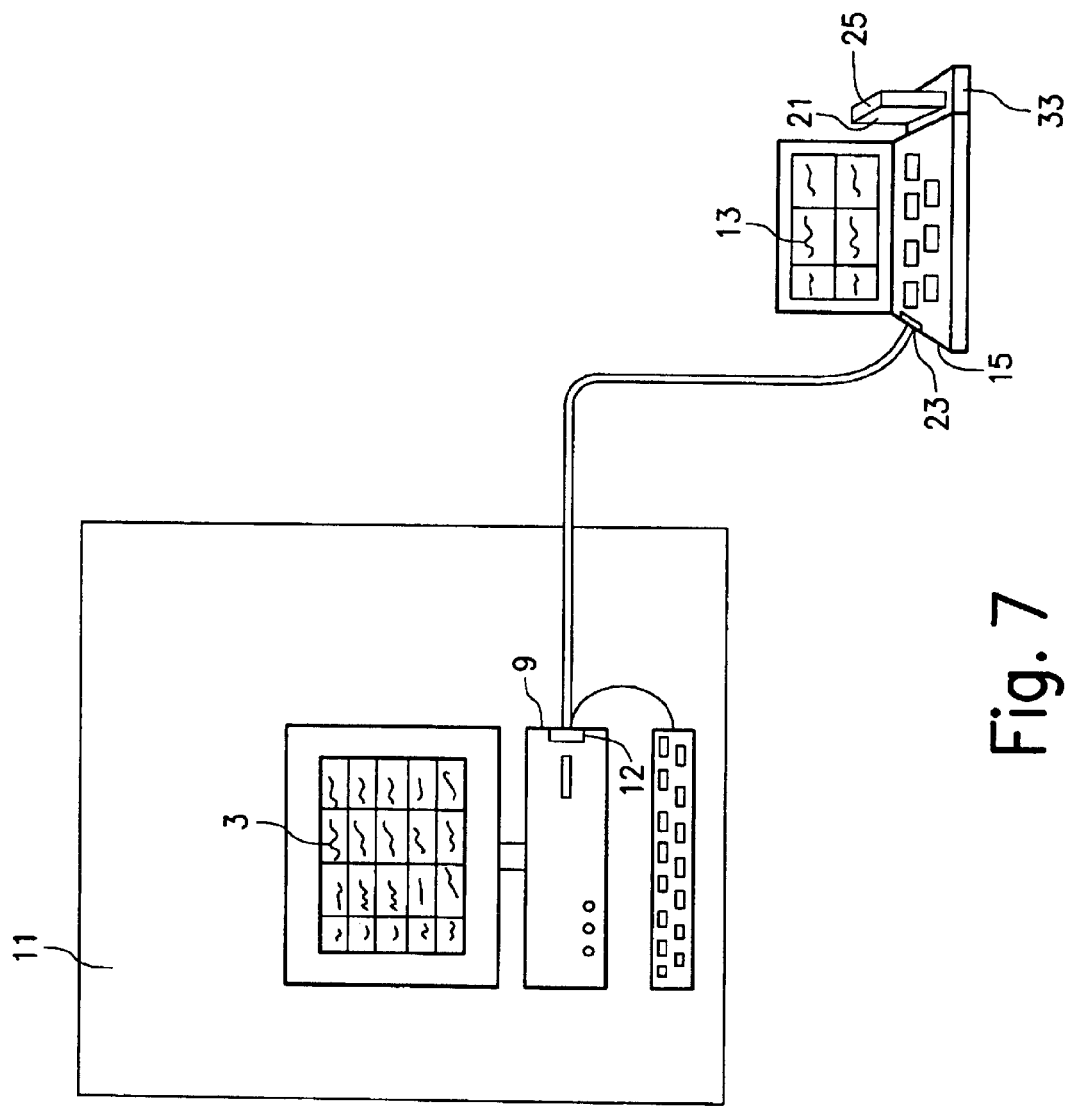
FIG. 7 illustrates a fourth embodiment of the system of the present invention wherein a host computer is maintained at a central location and a verification computer and portable unit are maintained at a parking facility to be checked.

Referring to FIGS. 4, 4a, 4b and 4c, a new customer enters a parking facility desiring to park his vehicle (FIG. 4, 101). An onsite parking facility employee (or the new customer) completes a new account information form and provides pertinent vehicle information (FIG. 4, 103). A new customer may be any person associated with the vehicle owner, including the vehicle owner, vehicle user, etc. The completed form is sent to the central location 11 for processing (FIG. 4, 105). Central location 11 registers the new account and enters the pertinent vehicle information into the master accounting database 3 (FIG. 4, 107). This is done for each automobile that is parked long term in the parking facility. It should be noted, however, that master accounting database 3 and/or verification database 13 may also include information relating to vehicles parked short term. The pertinent vehicle information that is initially entered becomes part of the master accounting database 3 on the host computer 9. Central location 11 regularly reviews pertinent vehicle information and determines whether any relevant vehicle information has changed (FIG. 4, 108). If it has changed, central location 11 updates master accounting database 3 to reflect these changes (FIG. 4, 109). Central location 11 issues an identification tag 7 to the new customer and sends it to the parking facility, which affixes it to the new customer's vehicle (FIG. 4, 111). It should be noted, however, that the parking facility may issue a transient parking tag 6 to vehicles parked short term. APVS can also access short term fee system data and verify automobiles currently parked in the facility.

Master accounting database 3 contains pertinent vehicle information. Some of this information may not be useful for purposes of checking a parking facility. Accordingly, central location 11 should examine the pertinent vehicle information and select and organize information for checking a parking facility (FIG. 4a, 113). Central location 11 must determine where to send the parking facility check information. It does this by determining whether the system implements a central verification computer 15 (FIG. 4*a*, 114). If the system implements a central verification computer 15, then this information should be transferred there (FIG. 4*a*, 115). Facility check information should be stored in verification database 13 (FIG. 4*a*, 117). Before checking a parking facility, verification database 13 should be transferred to portable unit 21 (FIG. 4*a*, 118). If the system does not implement a central verification computer 15, then the system user must determine whether the host computer maintains a separate verification database 13 (FIG. 4*a*, 116). If the system implements verification database 13, then parking facility check information should be transferred to it (FIG. 4*a*, 117). If the system does not implement verification database 13, the facility check transfer information should be transferred directly to unit 21 (FIG. 4*a*, 120). Information may be transferred via the linking means discussed herein. For example, the transfer may be accomplished either centrally (via a cabled cradle 33) or remotely via a modem and cradle arrangement.

Portable units 21 are distributed to the supervisory and managerial staff for implementation (FIG. 4*a*, 119). Each supervisor goes "on premise" (at the parking facility) to implement the parking facility "check" (FIG. 4*a*, 121). The supervisor downloads information relating to transiently parked automobiles (FIG. 4*a*, 122). The supervisor utilizes portable unit 21 to check the facility. The supervisor scans and/or manually enters identification tag 7 and/or tag 6 information with portable unit 21 (FIG. 4*a*, 123). The supervisor determines the type of account of the vehicle being scanned, i.e., whether the account is for an automobile parked long or short term (i.e., transiently parked) (FIG. 4*b*, 124).

If the automobile is parked long term, portable unit 21 associates identification tag 7 with the facility check information in verification database 13 or master accounting database 3 for each vehicle that is checked (FIG. 4*b*, 125). Relevant vehicle information will appear on display 27 (FIG. 4*b*, 127). The supervisor actively "checks in" the automobile and verifies its status as "active" or "delinquent" (FIG. 4*b*, 129). An automobile may be considered "delinquent" for a variety of reasons. For example, the vehicle may not be authorized to park in the facility (i.e., it is illegally parked), the customer is past due in payment, or any other reason. Should the verification indicate improper or illegitimate parking at the facility, this fact will be immediately evident. If the automobile is delinquent, the supervisor may take appropriate action (FIG. 4*b*, 130). Appropriate action, for example, may include removing a delinquent car from the parking facility, sending out a bill to a past due customer, or take any other action necessary to remedy the delinquency. The supervisor should record information relating to that particular vehicle (FIG. 4*b*, 131). It is also possible that the vehicle is legitimately parked but the pertinent vehicle information has changed for a variety of reasons (i.e., the customer may have purchased a new vehicle, obtained new license plates, painted his car, etc.). A digital time stamp will be created and stored as part of the checking procedure (FIG. 4*b*, 133). The supervisor determines whether there are more cars to be checked and repeats this process for every vehicle parked in the parking facility (FIG. 4*b*, 135). If the account being scanned is parked transiently, then the automobiles identification tag 6 information is recorded and verified, this information is correlated to the data stored on a fee computing system (FIG. 4*b*, 126). While checking each car parked at the facility, the supervisor may enter any clerical revisions and updates in the portable unit 21. For example, a red Honda may be parked in a space reserved for a blue Ford, or the customer has purchased a new car, has painted the car a new color, or has obtained a new plate. The supervisor will record any such inaccuracies. These updates may be entered using input means 29. Any updated information is stored on portable unit 21 until the check of the parking facility is completed. The supervisor should discuss such discrepancies with the on site employee to rectify the situation.

The supervisor must determine where to send the results of his check, i.e., he must determine whether the systems implements a central verification computer 15 (FIG. 4*c*, 136). If the system implements central verification computer 15, then upon completion of the facility check the results (including revisions and updates) of the check are transferred to that computer (FIG. 4*c*, 137). The results of the facility check are entered into verification database 13 and a history of the check is stored on verification computer 15 (FIG. 4*c*, 139). It should be noted, however, that the history of the check may be stored on any other database or computer. A system manager follows up on any action taken by the supervisor and/or takes further action with respect to delinquent automobiles (FIG. 4*c*, 140). If the system does not implement central computer 15, then the results are transferred directly to host computer 9 and the results of the check are entered therein (FIG. 4*b*, 141). These results may be entered into verification database 13 (if it exists) or into master accounting database 3. A system manager follows up on any action taken by the supervisor and/or takes further action with respect to delinquent automobiles (FIG. 4*c*, 140).

This process of checking a parking facility should be repeated regularly to ensure that no unauthorized vehicles are parked improperly and that all information concerning the vehicles is current (FIG. 4*c*, 147).

The method and apparatus described herein minimizes the time required to check a parking facility. This process previously took hours to complete and mistakes were unavoidable due to human error. The present invention, on the other hand, enables this process to be completed in much shorter time and is highly accurate. The "APVS" parking system allows a parking facility to maintain accurate and updated records for the vehicles parked in their facility and eliminate fraud or improper usage of the parking facility.

In the foregoing description of the invention, reference to the drawings, certain terms have been used for conciseness, clarity, and comprehension. However, no unnecessary limitations are to be implied from or because of the terms used, beyond the requirements of the prior art, because such terms are used for descriptive purposes and are intended to be broadly construed. Furthermore, the description and illustration of the invention are by way of example, and the scope of the invention is not limited to the exact details shown, represented, or described. As such, the present invention is not limited use with parking facilities and may easily be implemented in other appropriate fields.

Having now described a preferred embodiment of the invention, in terms of features, discoveries, and principals, changes that may become apparent to those skilled in the art may be made, without departing from the scope of the invention defined in the appended claims.

What is claimed is:

1. A system for checking and verifying the status of automobiles parked in a parking facility comprising:

a host computer having a master database, said master database further including pertinent information relating to each vehicle parked in the parking facility, said pertinent information including the type and characteristics of the vehicle, and a parking spot assigned to each vehicle approved to park in the facility;

said master database having a billing database, said billing database having information including information about the type of vehicle, the operator of a vehicle, said billing information further including a plurality of fee structures for a corresponding plurality of long term periods, said long term periods comprising weekly, monthly, and yearly periods, said billing information capable of confirming that fees are paid and that a vehicle is permitted to park on premises;

said host having a first means for transferring and receiving information in said master database;

said master database comprising a sub-database configured for positioning in at least one of the host computer or separate computer, said sub-database having information, the information including the characteristics of the vehicle, the characteristics including the type of vehicle, said information including the parking spot assigned to each vehicle approved to park in the facility and corresponding billing to confirm the category of vehicle, said information including billing information which consists of an indicator of whether the authorization for the vehicle is active or delinquent regarding a weekly, monthly, or yearly parking term;

the means for transferring being configured to communicate with a verification database; the sub-database functioning as a verification database;

identification means to be affixed to the automobiles parked in the parking facility;

at least one portable unit for checking the parking facility, wherein said portable unit is configured for:

(a) comparing and relating the information on said identification means with the pertinent information in said first database; and (b) determining whether the vehicle is the same category of vehicle that is authorized to park in the facility, including determining if the vehicle is parked in the authorized spot, and determining whether the billing status for the vehicle is accurate regarding the type of vehicle, and determining whether the authorization for the vehicle is active or delinquent regarding a weekly, monthly or yearly parking term by confirmation from the billing database and of the approval status;

said portable means having a second means for transferring and receiving information.

2. The system of claim 1, wherein said sub-data comprises information relevant to checking the parking facility.

3. The system of claim 2, wherein sub-databases is maintained on said host computer.

4. The system of claim 2, further comprising:

at least one verification computer, wherein said sub-database is maintained on said verification computer;

said verification computer having a third means for transferring and receiving information;

and said portable unit is configured for comparing and relating the information on said identification means with the pertinent information in said sub-database.

5. The system of claim 4, further comprising a sub-host computer for storing said pertinent vehicle information, said sub-host maintained the parking facility to be checked;

a cradle for downloading said pertinent vehicle information onto said portable unit.

6. The system of claim 1, said portable unit further comprising data reading means; a display; and input means.

7. The system of claim 5, wherein said first, second and third means for transferring information are selected from the group consisting of modems, hot wires, radio frequencies, or infrared signals.

8. The system of claim 1, wherein said portable unit is a portable computing device with a bar code scanner or a lap top computer with an integrated bar code scanner.

9. The system of claim 1, said host computer further comprises a first software configured for selecting and organizing data for checking a parking facility; and said portable unit further comprises a second software configured for updating and organizing information gathered during the checking of the parking facility.

10. The system of claim 5, said host computer further comprises a first software configured for selecting and organizing data for checking a parking facility;

said portable unit further comprises a second software configured for updating and organizing information gathered during the checking of the parking facility; and said verification computer further comprises a third software configured for updating information and issuing parking facility check reports.

11. The system of claim 5, wherein said host computer, said verification computer, and said sub-host computer are connected via a network connection.

12. A method for checking and verifying the status of automobiles parked in a parking facility comprising the steps of:

maintaining a master database on a host computer, said database having pertinent information relating the automobiles parked in the parking facility, said pertinent information including the type and characteristics of the vehicle, and a parking spot assigned to each vehicle approved to park in the facility;

maintaining a sub-database on said host computer, said second database having information relating to checking a parking facility, said information including the characteristics of the vehicle, the characteristics including the type of vehicle, said information including the parking spot assigned to each vehicle approved to park in the facility and corresponding billing to confirm the category of vehicle, said information including short term and long term billing account information which consists of an indicator of whether the authorization for the vehicle is active or delinquent regarding a weekly, monthly, or yearly parking term;

affixing an identification means to the automobiles parked in the parking facility, the identification means having a first configuration for short term parking and a second configuration for long term parking;

transferring said sub-database to a portable unit, wherein said portable unit is configured for:

(a) checking said parking facility with said portable unit, wherein said portable unit relates said identification means with said pertinent information, said checking including identifying an account associated with the identification means and determining whether the account is for short term parking or long term parking; and (b) determining whether the vehicle is the same category of vehicle that is authorized to park in the facility, including determining if the vehicle is parked in the authorized spot, and determining whether the billing status for the vehicle is accurate regarding the type of vehicle, and determining whether the authorization for the vehicle is active or delinquent regarding a weekly, monthly or yearly parking term by confirmation from the billing database and of the approval status;

verifying and storing on said portable unit the status of each automobile parked in the parking facility.

13. The method of claim 12, further comprising the steps of
said checking further comprises inputting information on said identification means;
updating and organizing results of said checking of the parking facility
sending results of said check to said host computer;
entering into said first database the results of said check;
taking appropriate action with respect to delinquent cars.

14. The method of claim 12, wherein
implementing a first software configured for selecting and organizing relevant data for said checking of said parking facility, wherein said first software is maintained on said first host computer and used with said first database; and
implementing a second software configured for updating and organizing information gathered during said checking of said parking facility, wherein said second software is maintained on said portable unit.

15. The method of claim 13, further comprising the steps of
maintaining said host computer at a central location;
providing said portable unit to a supervisor who will check the parking facility;
downloading said results of said check onto a sub-host computer with a cradle which is maintained at the parking facility, wherein said results of said check are sent from said sub-host to said host via transfer means.

16. A method for checking and verifying the status of automobiles parked in a parking facility comprising the steps of:
maintaining a master database on a host computer, said database having pertinent information relating the automobiles parked in the parking facility, said pertinent information including the type and characteristics of the vehicle, and a parking spot assigned to each vehicle approved to park in the facility;
maintaining a sub-database on said verification computer, said second database comprising only information relevant to checking the parking facility, said information including, the characteristics of the vehicle, the characteristics including the type of vehicle, said information including the parking spot assigned to each vehicle approved to park in the facility and corresponding billing to confirm the category of vehicle, said information including short term and long term billing account information which consists of an indicator of whether the authorization for the vehicle is active or delinquent regarding a weekly, monthly, or yearly parking term;
affixing an identification means to the automobile parked in the parking facility, said identification being adapted for identifying a billing account associate with each vehicle, each billing account being configured for identifying a plurality of vehicles;
transferring said first database to said verification computer;
selecting and organizing, from first database, information relevant to checking a parking facility;
entering said relevant information into said second database;
transferring said second database to a portable unit at the parking facility to be checked, wherein said portable unit is configured for:
(a) checking said parking facility with said portable unit, wherein said portable unit relates said identification means with said pertinent information, said checking including identifying an account associated with the identification means and determining whether the account is for short term parking or long term parking; and
(b) determining whether the vehicle is the same category of vehicle that is authorized to park in the facility, including determining if the vehicle is parked in the authorized spot, and determining whether the billing status for the vehicle is accurate regarding the type of vehicle, and determining whether the authorization for the vehicle is active or delinquent regarding a weekly, monthly or yearly parking term by confirmation from the billing database and of the approval status; and
verifying and storing on said portable unit the status of each automobile parked in the parking facility.

17. The method of claim 16, further comprising the steps of
said checking further comprises inputting information on said identification means;
updating and organizing results of said checking of the parking facility;
sending said results of said check to said verification computer.

18. The method of claim 16, further comprising the steps of
implementing a first software configured for selecting and organizing relevant data for said check of said parking facility, wherein said first software is maintained on said first host computer and used with said first database;
implementing a second software configured for updating and organizing information gathered during said checking of said parking facility, wherein a said second software is maintained on said portable unit; and
implementing a third software configured for updating information and preparing parking check reports.

19. The method of claim 17, further comprising the steps of
maintaining said host computer at a central location;
maintaining said verification computer a second central location; providing said portable unit to a supervisor who will check the parking facility;
downloading said results of said check onto a sub-host computer with a cradle which is maintained at the second central location, where in said results of said check are transferred from said sub-host to said verification computer.

20. The method of claim 16, further comprising the steps of
obtaining information relating vehicles parked long term and short term in the facility;
checking the status of said vehicles parked long term and short term; and
taking appropriate action with respect to said long term and short term vehicles have a closed account.

21. The method of claim 12, further comprising the steps of
obtaining information relating vehicles parked long term and short term in the facility;
checking the status of said vehicles parked long term and short term; and
taking appropriate action with respect to said long term and short term vehicles having a closed account.

* * * * *

UNITED STATES PATENT AND TRADEMARK OFFICE
CERTIFICATE OF CORRECTION

PATENT NO. : 6,832,206 B1
DATED : December 14, 2004
INVENTOR(S) : Marc Chelnik

It is certified that error appears in the above-identified patent and that said Letters Patent is hereby corrected as shown below:

Column 10,
Line 66, please add -- first -- after "having" and before "information".

Column 10, line 67 to column 11, line 1,
Please delete "said billing information further including".

Column 11,
Line 4, please replace "billing" with -- first --.
Line 12, please add -- second -- at the start of the line 12 before "information".
Line 12, please add -- second -- after "said" and before "information".
Line 14, please replace "said information including" with -- said second information further including --.
Line 14, please add a comma -- , -- after "facility".
Line 18, please replace "and corresponding billing to confirm" with -- , billing information confirming --.
Line 18, please replace "said information including billing information which consists" with -- and billing information consisting --.
Line 28, please delete "the" after "relating".
Line 30, please replace "first" with -- master --.
Line 34, please delete "and" before "determining".

Column 12,
Line 26, please add -- master -- after "said".
Line 33, please replace "second database" with -- sub-database --.
Line 36, please add -- further -- after "information" but before "including".
Line 38, please replace "and corresponding billing to confirm" with -- , billing information confirming --.
Line 39, please replace "said information including" with -- and --.

UNITED STATES PATENT AND TRADEMARK OFFICE
CERTIFICATE OF CORRECTION

PATENT NO. : 6,832,206 B1
DATED : December 14, 2004
INVENTOR(S) : Marc Chelnik

It is certified that error appears in the above-identified patent and that said Letters Patent is hereby corrected as shown below:

Column 13,
Line 33, please add -- master -- after "said".
Line 39, please replace "second database" with -- sub-database --.
Lines 42-43, please add -- further -- after "information" but before "including".
Lines 44-45, please replace "and corresponding billing to confirm" with
-- , billing information confirming --.

Signed and Sealed this

Twenty-third Day of August, 2005

JON W. DUDAS
*Director of the United States Patent and Trademark Office*